United States Patent
Sakowski et al.

(10) Patent No.: US 12,229,168 B2
(45) Date of Patent: Feb. 18, 2025

(54) READING COMPRESSED DATA DIRECTLY INTO AN IN-MEMORY STORE

(71) Applicant: Microsoft Technology Licensing, LLC, Redmond, WA (US)

(72) Inventors: Krystian Sakowski, Bellevue, WA (US); Marius Dumitru, Sammamish, WA (US); Amir Netz, Bellevue, WA (US); Cristian Petculescu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/326,983

(22) Filed: May 31, 2023

(65) Prior Publication Data
US 2024/0370462 A1 Nov. 7, 2024

Related U.S. Application Data

(60) Provisional application No. 63/500,567, filed on May 5, 2023.

(51) Int. Cl.
*G06F 17/30* (2006.01)
*G06F 16/174* (2019.01)
(Continued)

(52) U.S. Cl.
CPC ........ *G06F 16/285* (2019.01); *G06F 16/1744* (2019.01); *G06F 16/2255* (2019.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 6,332,175 B1 * 12/2001 Birrell ..................... G11B 27/11
704/502
6,349,150 B1 * 2/2002 Jones ................... H04N 19/172
375/E7.184
(Continued)

FOREIGN PATENT DOCUMENTS

EP 3848815 A1 7/2021

OTHER PUBLICATIONS

"Parquet", Retrieved From: https://duckdb.org/docs/data/parquet.html, Retrieved On: Jan. 19, 2023, 8 Pages.
(Continued)

*Primary Examiner* — Hung D Le
(74) *Attorney, Agent, or Firm* — Barta Jones, PLLC

(57) ABSTRACT

Example solutions read compressed data from a file in persistent storage, directly into an in-memory store without decompression. Some examples transcode the compression scheme used by the file into the compression scheme used by the in-memory store whereas, in other examples, the in-memory store is compatible with the compression scheme used by the file. In some examples that use transcoding, radix clustering is used to speed up compression dictionary transcoding. The radix clustering minimizes cache misses, thereby increasing the efficiency of memory access. These approaches significantly improve cold start times when responding to queries.

20 Claims, 14 Drawing Sheets

(51) Int. Cl.
*G06F 16/22* (2019.01)
*G06F 16/28* (2019.01)

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | | |
|---|---|---|---|---|
| 6,377,530 | B1* | 4/2002 | Burrows | G11B 31/02 |
| 6,523,102 | B1* | 2/2003 | Dye | G06F 12/08 |
| | | | | 711/170 |
| 6,567,911 | B1* | 5/2003 | Mahmoud | G06F 9/4401 |
| | | | | 713/1 |
| 10,642,520 | B1* | 5/2020 | Zhao | G06F 3/0644 |
| 2004/0163112 | A1* | 8/2004 | Matula | G06F 8/65 |
| | | | | 725/50 |
| 2004/0253941 | A1* | 12/2004 | Rivera | H04W 4/24 |
| | | | | 455/408 |
| 2005/0114601 | A1* | 5/2005 | Ramakrishnan | G06F 12/0802 |
| | | | | 711/158 |
| 2007/0263876 | A1* | 11/2007 | De Waal | H04L 9/00 |
| | | | | 380/286 |
| 2008/0162517 | A1* | 7/2008 | Lyer | H03M 7/3088 |
| 2008/0294676 | A1* | 11/2008 | Faerber | G06F 16/2237 |
| | | | | 707/999.102 |
| 2009/0007090 | A1* | 1/2009 | Hirao | G06F 16/1744 |
| | | | | 717/168 |
| 2009/0037512 | A1* | 2/2009 | Barsness | G06F 16/27 |
| | | | | 709/201 |
| 2009/0138655 | A1* | 5/2009 | Cho | G06F 12/0246 |
| | | | | 711/E12.001 |
| 2009/0193040 | A1* | 7/2009 | Provencal | H03M 7/30 |
| 2010/0030796 | A1* | 2/2010 | Netz | G06F 16/24561 |
| | | | | 707/756 |
| 2011/0185149 | A1* | 7/2011 | Gruhl | G06F 3/0608 |
| | | | | 711/216 |
| 2012/0310917 | A1* | 12/2012 | Sheinin | G06F 16/24561 |
| | | | | 707/E17.054 |
| 2014/0108704 | A1* | 4/2014 | Boring | G06F 8/654 |
| | | | | 711/103 |
| 2015/0170758 | A1* | 6/2015 | Henry | G06F 9/44505 |
| | | | | 365/225.7 |
| 2015/0178222 | A1* | 6/2015 | Hopper | G06F 3/0619 |
| | | | | 711/159 |
| 2016/0085834 | A1* | 3/2016 | Gleeson | G06F 16/273 |
| | | | | 707/693 |
| 2016/0124683 | A1* | 5/2016 | Zhang | G06F 3/0616 |
| | | | | 711/154 |
| 2016/0147447 | A1* | 5/2016 | Blanco | G06F 16/28 |
| | | | | 711/154 |
| 2016/0350371 | A1* | 12/2016 | Das | G06F 12/023 |
| 2017/0039137 | A1* | 2/2017 | Mukherjee | G06F 12/0824 |
| 2017/0039229 | A1* | 2/2017 | Verma | G06F 16/22 |
| 2017/0060772 | A1* | 3/2017 | Krishnappa | G06F 16/24552 |
| 2017/0109406 | A1* | 4/2017 | Chavan | G06F 16/24561 |
| 2017/0220262 | A1* | 8/2017 | Zhang | G06F 11/1012 |
| 2017/0344578 | A1* | 11/2017 | Constantinescu | G06F 16/1744 |
| 2017/0357454 | A1* | 12/2017 | Kumar | H03M 7/30 |
| 2018/0060374 | A1* | 3/2018 | Verma | G06F 16/2282 |
| 2019/0146910 | A1* | 5/2019 | Cho | G06F 12/0246 |
| | | | | 711/103 |
| 2019/0155514 | A1* | 5/2019 | Cho | G06F 3/0608 |
| 2019/0310859 | A1* | 10/2019 | Kopfstedt | G06F 9/4401 |
| 2019/0332387 | A1* | 10/2019 | Bumbulis | G06F 16/221 |
| 2020/0364269 | A1* | 11/2020 | Kwan | G06F 16/1847 |
| 2021/0109974 | A1* | 4/2021 | Shekhar | G06F 3/064 |
| 2022/0066656 | A1* | 3/2022 | Kim | G06F 11/1451 |
| 2022/0321900 | A1* | 10/2022 | Kang | H04N 19/127 |
| 2023/0291653 | A1* | 9/2023 | Shiner | H04L 41/024 |

OTHER PUBLICATIONS

Behm, et al., "Photon: A Fast Query Engine for Lakehouse Systems", In Proceedings of the International Conference on Management of Data, Jun. 12, 2022, 12 Pages.

Li, et al., "SPARK-12854: Vectorize Parquet reader", Retrieved From: https://issues.apache.org/jira/browse/SPARK-12854, Jan. 16, 2016, 2 Pages.

Malone, James, "Iceberg Tables: Powering Open Standards with Snowflake Innovations", Retrieved From: https://www.snowflake.com/blog/iceberg-tables-powering-open-standards-with-snowflake-innovations/, Aug. 8, 2022, 7 Pages.

"Concepts", Retrieved from: https://parquet.apache.org/docs/concepts/, Mar. 24, 2022, 1 Page.

"The VertiPaq Engine in DAX—Understanding VertiPaq Compression", Retrieved from: https://www.microsoftpressstore.com/articles/article.aspx?p=2449192&seqNum=3, Nov. 3, 2015, 8 Pages.

Damme, et al., "Direct Transformation Techniques for Compressed Data: General Approach and Application Scenarios", In European Conference on Computer Vision, Springer, Jan. 1, 2015, pp. 151-165.

International Search Report and Written Opinion received for PCT Application No. PCT/US2024/026726, Jul. 24, 2024, 14 pages.

Iyer, et al., "Data Compression Support in Databases", In Proceedings of the 20th VLDB Conference, Jan. 1, 1994, pp. 695-704.

* cited by examiner

READING COMPRESSED DATA DIRECTLY INTO AN IN-MEMORY STORE

CROSS-REFERENCE TO RELATED APPLICATION

This application claims priority to U.S. Provisional Patent Application No. 63/500,567, entitled "READING COMPRESSED DATA DIRECTLY INTO AN IN-MEMORY STORE," filed on May 5, 2023, the disclosure of which is incorporated herein by reference in its entirety.

BACKGROUND

Common cloud-based architectures for analytical query engines decouple compute resources from persistent storage in data lakes using open storage formats. The data is stored in a compressed format, leading to performance issues during a cold start, in which data, that is required for responding to a query, must be loaded from storage into an initially empty in-memory store (e.g., in-memory column store). For example, responding to a query from a cold start may take as much as 40 times longer (or more) than responding to a query with a fully-populated in-memory store. Two approaches are commonly used.

In one, the compressed data is decompressed (e.g., exploded) upon reading and loaded into the in-memory store in its decompressed state. In this first approach, the in-memory store uses a significant amount of memory due to the nature of the in-memory store not supporting compressed data. Vectorized query execution in this kind of in-memory store has reduced performance than an in-memory store with compression.

The other approach uses an in-memory store with a compressed data format that is more memory-efficient and is able to leverage the performance advantages of vectorized query execution kernels. However, due to differences in the compression schemes between what is used in the persistent storage and what is used in the in-memory store, the reading process must decompress the data from the persistent storage format into a decompression buffer, and recompress the decompressed data using a compression scheme that is compatible with the in-memory store. This adds time to the cold start, in addition to consuming memory for the decompression buffer. Both approaches have inefficiencies.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for reading compressed data directly into an in-memory store include reading compressed data from a file, wherein the compressed data in the file has a storage compression scheme with a storage compression dictionary. Without decompressing the compressed data, the compressed data is loaded into an in-memory store. The compressed data in the in-memory store has an in-memory compression scheme. A query is performed on the compressed data in the in-memory store, and a query result is returned. In some examples, the in-memory compression scheme is different than the storage compression scheme, whereas in some examples, the in-memory compression scheme and the storage compression scheme are the same. In some examples, the in-memory compression scheme uses a storage compression dictionary and the in-memory compression scheme uses an in-memory compression dictionary.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Example solutions for reading compressed data, from a file in persistent storage, directly into an in-memory store without decompression. Some examples transcode the compression scheme used by the file into the compression scheme used by the in-memory store whereas, in other examples, the in-memory store is compatible with the compression scheme used by the file. In some examples that use transcoding, radix clustering is used to speed up transcoding. The radix clustering minimizes cache misses, thereby increasing the efficiency of memory access. These approaches significantly improve cold start times when responding to queries.

The example solutions described herein reduce computational burdens by avoiding decompression and recompression, including avoiding decompression/compression operations involved with bit-packing and run length encoding (RLE), and improving cache locality. Example solutions described herein further reduce computational burdens by reducing memory pressure, for example by precluding the need for decompression buffers. Cache performance is improved by both retaining the data in a compressed state, so that it is more likely to fit within a local cache, and by radix clustering that improves the likelihood of cache hits as described below. These computational savings are able to reduce the amount of computing hardware required and electrical power consumption needed to maintain or even improve data query performance.

Examples accomplish these advantageous technical performance benefits by at least, without decompressing the compressed data, loading the compressed data into an in-memory store, and/or transcoding a storage compression dictionary into an in-memory compression dictionary based on radix clustering.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
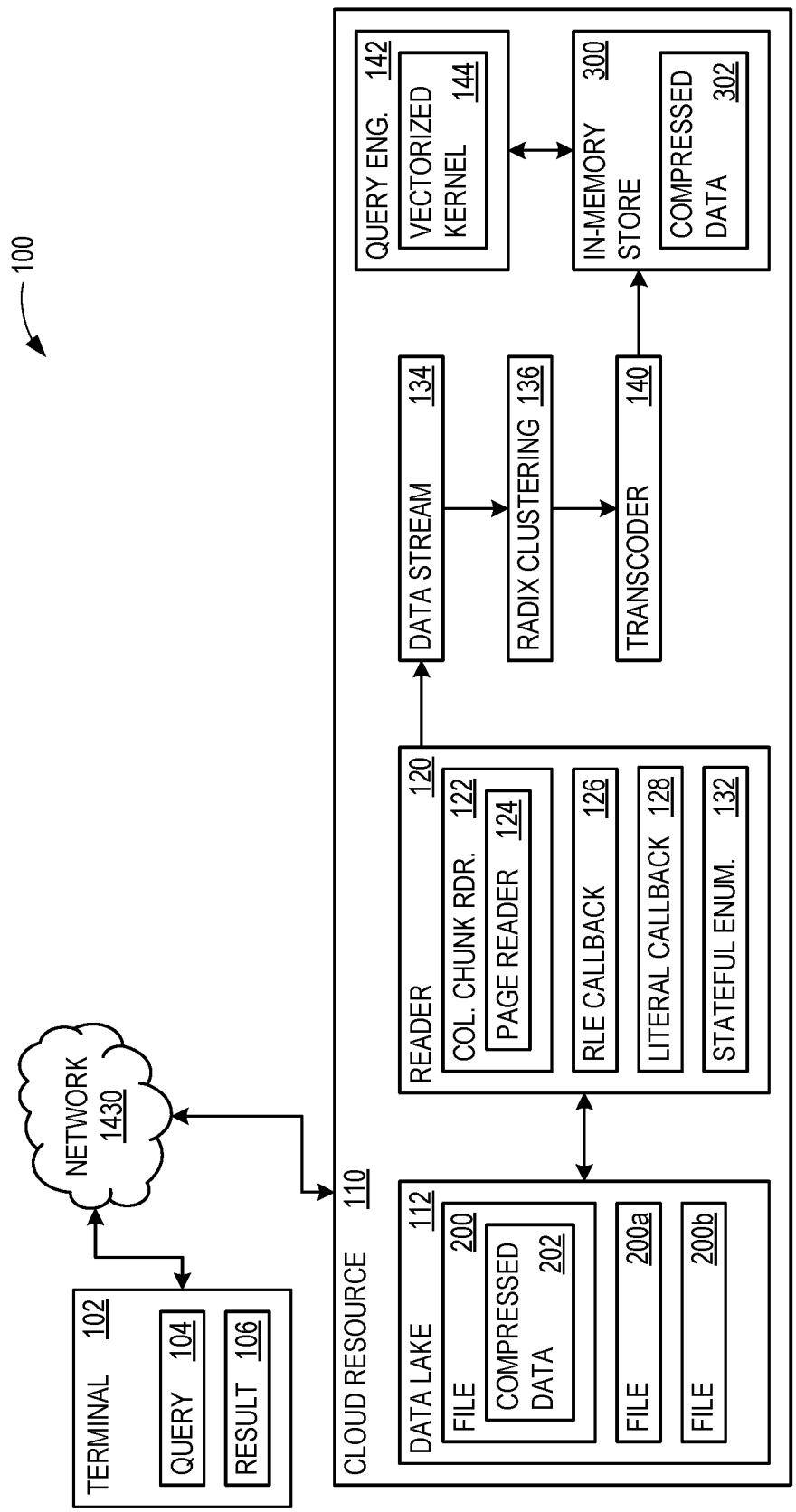
FIG. 1 illustrates an example architecture that advantageously provides for reading compressed data directly into an in-memory store without decompression.

FIG. 1 illustrates an example architecture 100 that advantageously provides for reading compressed data from a file 200 directly into an in-memory store 300 without decompression. In architecture 100, a user terminal 102 performs a query 104 using a cloud resource 110 across a network 1430 (e.g., a computer network) and receives a query result 106 in response. Cloud resource 110 includes a data lake 112 for persistent storage and a query engine 142, which may be decoupled and use separately scalable compute resources located on different nodes than those used by data lake 112.

In some examples, query engine 142 is an analytical query engine that uses a vectorized query execution kernel 144 capable of performing queries on compressed data, such as performing query 104 on compressed data 302 in an in-memory store 300. In some examples, query engine 142 supports business intelligence (BI) analytics services. In-memory store 300 and compressed data 302 are shown in further detail in FIG. 3, and network 1430 is described in further detail in relation to FIG. 14.

A reader 120 retrieves compressed data 202 from a file 200 in data lake 112, and loads the data into in-memory store 300 as compressed data 302. Compressed data 202 is transcoded, in some examples, into compressed data 302 using a transcoder 140, but is not decompressed. In some examples, a radix clustering stage 136 performs radix clustering on a data stream 134 of the data passing from reader 120 to in-memory store 300, to speed up the transcoding process. Transcoding is digital-to-digital conversion of one encoding scheme to another, for example converting the data compression scheme(s) used in compressed data 202 to the data compression scheme(s) used in compressed data 302. This is needed when vectorized query execution kernel 144, which is compatible with the data compression scheme(s) used in compressed data 302 is incompatible with the data compression scheme(s) used in compressed data 202.

Figure 2:
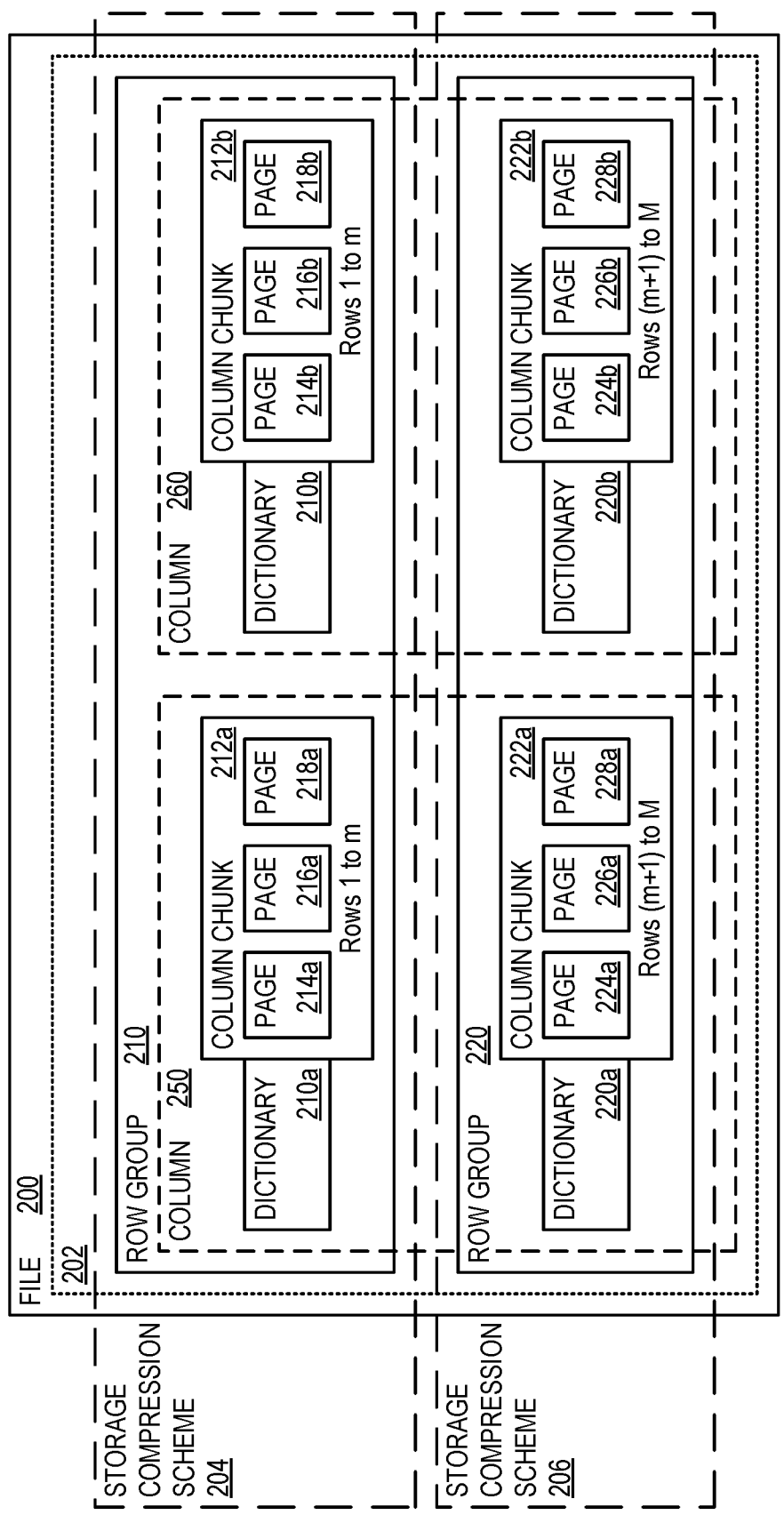
FIG. 2 illustrates an exemplary file storing compressed data, such as may be used in the example architecture of FIG. 1.
Figure 6:
FIG. 6 illustrates an example of run length encoding (RLE), such as may be used in the example architecture of FIG. 1.
Figure 7:
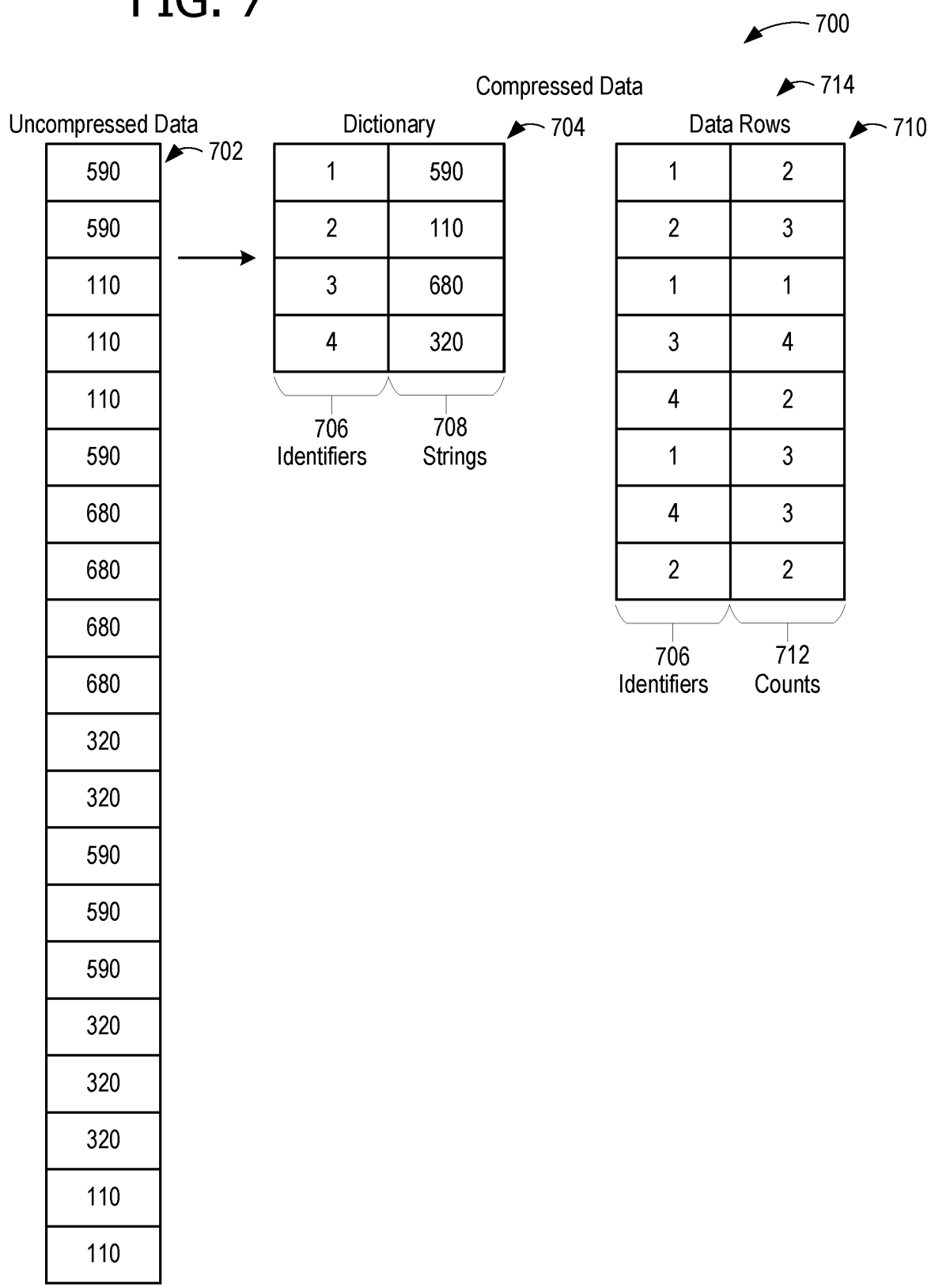
FIG. 7 illustrates an example of combining the compression schemes of FIGS. 5 and 6, such as may occur in the example architecture of FIG. 1.
Figure 8:
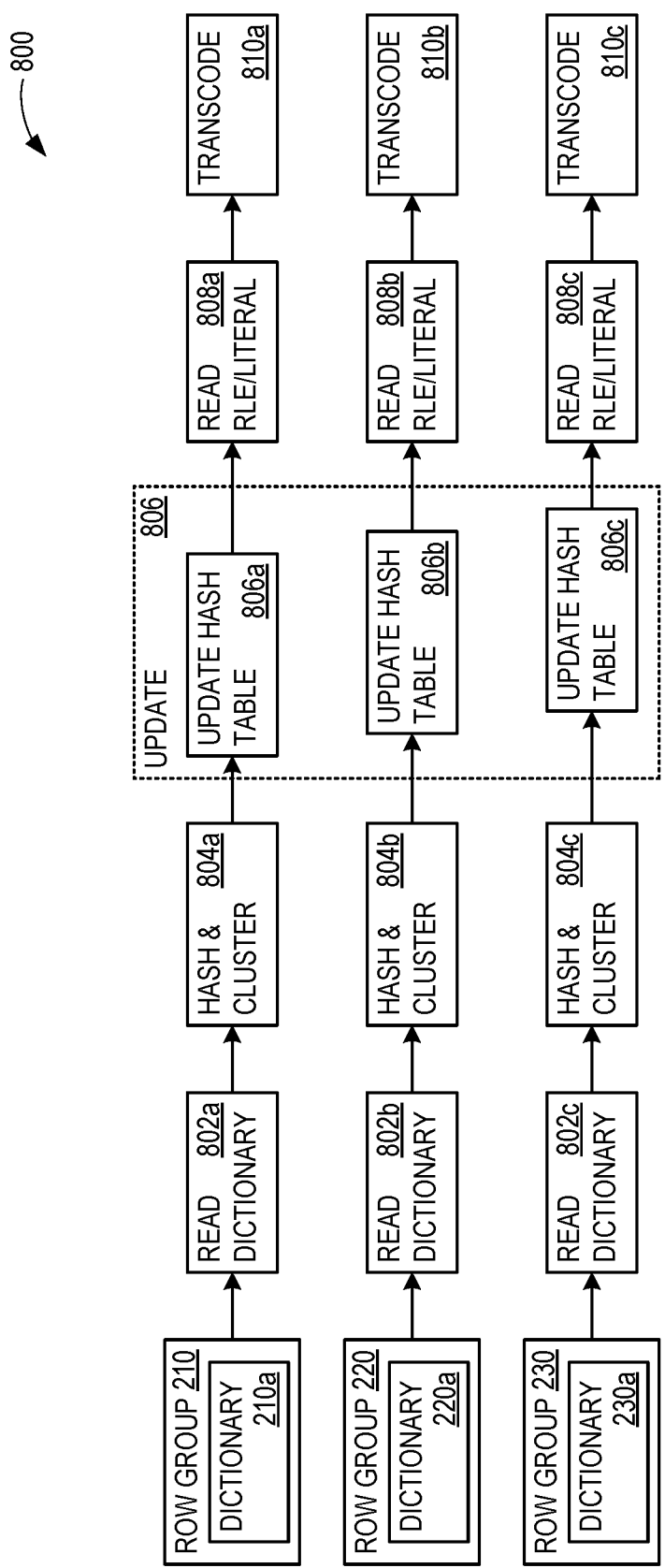
FIG. 8 illustrates an example workflow of radix clustering, such as may be used in the example architecture of FIG. 1.
Figure 9:
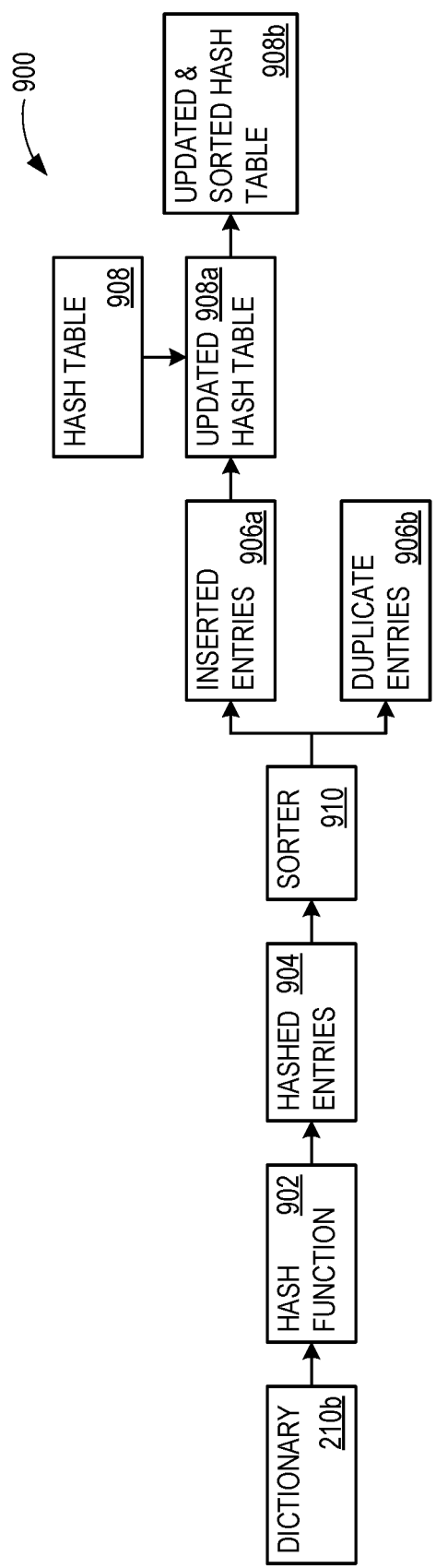
FIG. 9 illustrates an example architecture for radix clustering, such as may be used in the example architecture of FIG. 1.

File 200 and compressed data 202 are shown in further detail in FIG. 2, examples of compression that may be used in compressed data 202 and compressed data 302 are shown in FIGS. 4-7, and radix clustering stage 136 is described in further detail in relation to FIGS. 8 and 9.

Data lake 112 is shown as having multiple files, such as a file 200a and a file 200b, in addition to file 200. In some examples, data lake 112 offers persistent storage capability with properties of atomicity, consistency, isolation, and durability (ACID), along with time travel and other features. Files 200, 200a, and 200b may be columnar-format file (column-oriented) data files such as parquet, and/or optimized row-columnar (ORC) files that use compression dictionaries that are specific to column chunks. A column chunk is a chunk of the data for a particular column. Column chunks include a selected set of rows from a row group, and are contiguous in the data file. A row group is a horizontal partitioning of data into rows, and has a column chunk for each column in the data set. This is shown in further detail in relation to FIG. 2.

Figure 5:
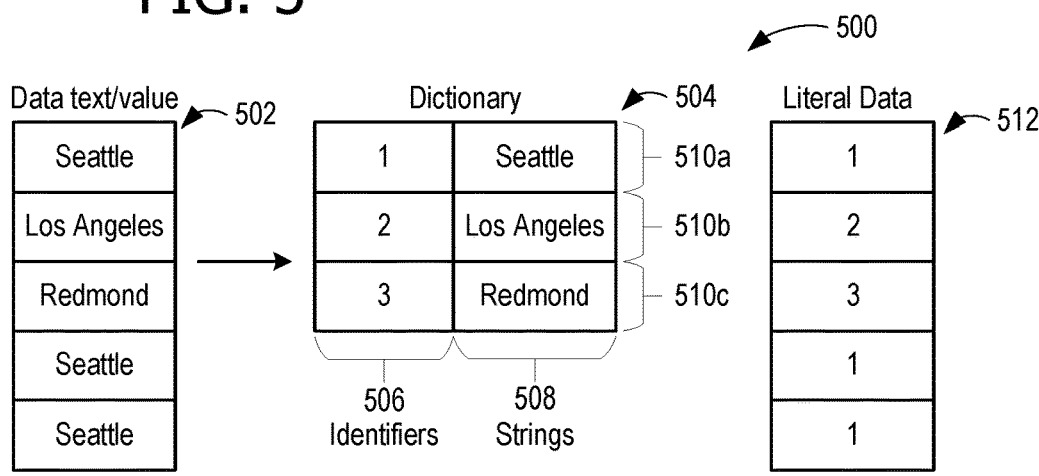
FIG. 5 illustrates an example of dictionary compression, such as may be used in the example architecture of FIG. 1.

Reader 120 has a column chunk reader 122 to read column chunks from file 200, and a page reader 124 to read multiple pages within a column chunk. There are two options illustrated for reader 120. One option uses a set of callbacks, an RLE callback 126 that reads RLE data and a literal data callback 128 that reads literal data, which is not RLE compressed (although literal data may be compressed by other compression schemes, such as bit-packing). In some examples, RLE callback 126 is vectorized. Further detail on RLE versus literal data is shown in FIGS. 5 and 6.

Another option uses a stateful enumerator 132 instead of RLE callback 126 and literal data callback 128. Stateful enumerator 132 does not explode data, but is aware of its reading state and can react to input differently based on its state to iterate the entire column content from the column chunk being read. For example, a value that is being read is either a literal value or an RLE value (which has a value and a count), based on whether the read event occurs from within a literal or RLE passage within file 200.

FIG. 2 illustrates further detail for file 200. In file 200, column data is stored across row groups. Multiple types of encoding may be used. For RLE encoding, in some examples, each column chunk has its own dictionary. File 200 is shown with two row groups, a row group 210 and a row group 220, although a different number of row groups may be used in some examples.

Compressed data 202 uses two compression schemes, one per row group, such as a storage compression scheme 204 for row group 210 and a storage compression scheme 206 for row group 220. Since having different compression dictionaries in different columns also varies the compression scheme, storage compression scheme 204 has two subsets: one for a column 250, which uses a storage compression dictionary 210a in row group 210, and another for a column 260, which uses a storage compression dictionary 210b in row group 210. Similarly, storage compression scheme 206 has two subsets: one for column 250, which uses a storage compression dictionary 220a in row group 220, and another for column 260, which uses a storage compression dictionary 220b in row group 220. File 200 thus has a plurality of storage compression dictionaries, which include storage compression dictionaries 210a, 220a, 210b, and 220b.

Columns 250 and 260 each spans row groups 210 and 220. Although two columns are shown, a different number of columns may be used in some examples. As shown, columns 250 and 260 each have M rows, with a first subset of rows in row group 210 and the remainder in row group 220. In this example, a larger of number of row groups will distribute the rows differently. In the illustrated example, a column chunk 212a in row group 210 has some rows of column 250, a column chunk 222a in row group 220 has additional rows of column 250, a column chunk 212b in row group 210 has some rows of column 260, and a column chunk 222b in row group 220 has additional rows of column 260.

Column chunk 212a is shown as having three pages, a page 214a, a page 216a, and a page 218a, and uses storage compression dictionary 210a. Some examples use a different number of pages in column chunks. Column chunk 212b is shown as having three pages, a page 214b, a page 216b, and a page 218b, and uses storage compression dictionary 210b. Column chunk 222a is shown as having three pages, a page 224a, a page 226a, and a page 228a, and uses storage compression dictionary 220a. Column chunk 222b is shown as having three pages, a page 224b, a page 226b, and a page 228b, and uses storage compression dictionary 220b.

Figure 3A:
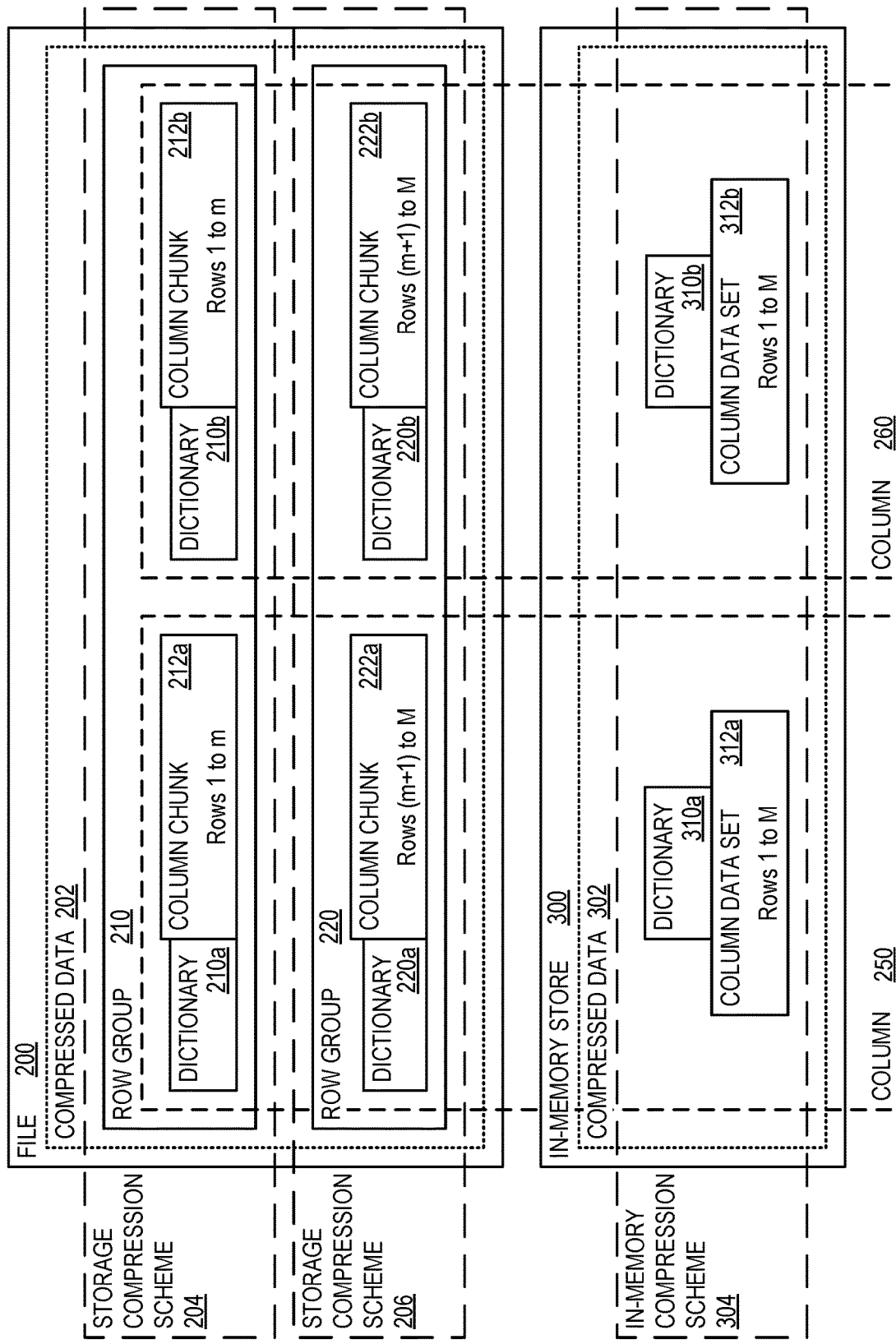
FIG. 3A illustrates a comparison between the exemplary file of FIG. 2 and an in-memory store, such as may be used in the example architecture of FIG. 1.

FIG. 3A illustrates a comparison of data structure between file 200 and in-memory store 300. For purposes of illustration, corresponding columns are shown spanning file 200 and in-memory store 300. Whereas file 200 broke the rows of columns 250 and 260 into chunks within row groups, permitting differing compression dictionaries between the row groups, in-memory store 300 uses a single compression dictionary per column. Some examples may use a single compression dictionary for the entirety of in-memory store 300.

In the illustrated example, column chunks 212a and 222a are combined after possible transcoding) into a column data set 312a that spans the entirety of the rows of column 250. Column data set 312a uses an in-memory compression dictionary 310a that is a result of combining (after possible transcoding) storage compression dictionaries 210a and 220a. Similarly, column chunks 212b and 222b are combined (after possible transcoding) into a column data set 312b that spans the entirety of the rows of column 260. Column data set 312b uses an in-memory compression dictionary 310b that is a result of combining (after possible transcoding) storage compression dictionaries 210b and 220b. In examples that use different compression dictionaries for different columns, an in-memory compression scheme 304 has two subsets: one for a column 250, which uses in-memory compression dictionary 310a, and another for column 260, which uses in-memory compression dictionary 310b.

Figure 3B:
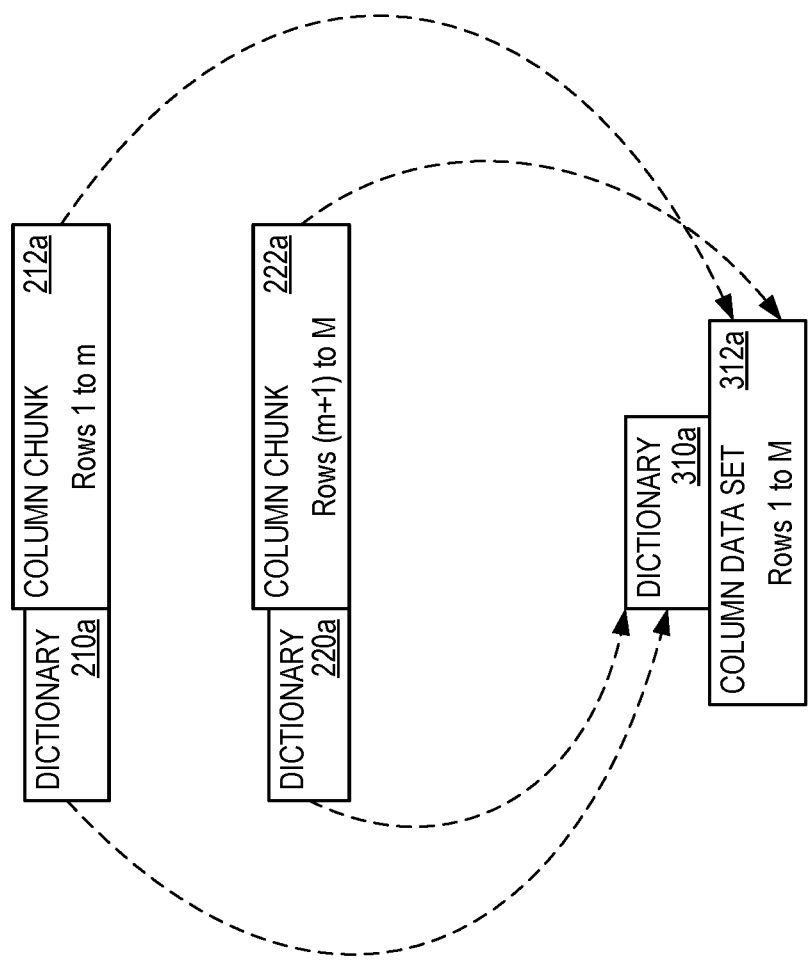
FIG. 3B illustrates further detail for the comparison of FIG. 3A.

FIG. 3B illustrates further detail for the comparison of FIG. 3A. Storage compression dictionary 210a is combined with storage compression dictionary 220a into in-memory compression dictionary 310a. When in-memory store 300 is not compatible with both storage compression schemes 204 and 206 or the layout of file 200, transcoding from storage compression schemes 204 and 206 into in-memory compression scheme 304 is needed. Storage compression dictionaries 210a and 220a are combined into in-memory compression dictionary 310a using transcoding (e.g., by transcoder 140) and column chunks 212a and 222a are transcoded, in addition to concatenation, to create column data set 312a.

Examples of incompatibilities include differing dictionary identifiers (see FIG. 5), different counts of repeating values or characters for triggering RLE, the number, and other compression differences, such as differences in bit-packing and value encoding compression parameters. As an example of RLE differences, one compression scheme may trigger RLE (see FIG. 6) upon encountering 10 repeating occurrences of a value, whereas another compression scheme may trigger RLE upon encountering 20 repeating occurrences of a value.

Figure 3C:
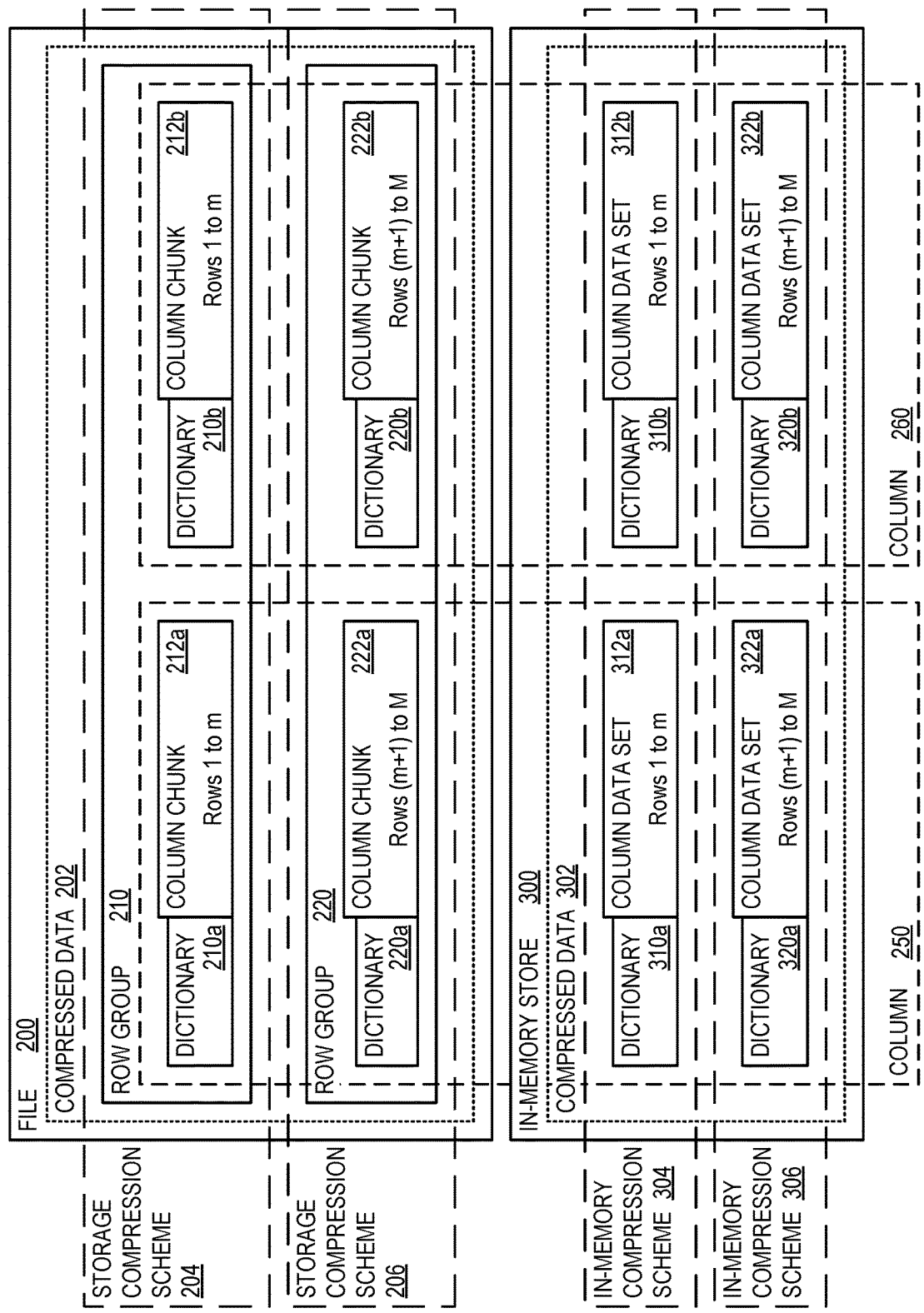
FIG. 3C illustrates another comparison between the exemplary file of FIG. 2 and an in-memory store, such as may be used in the example architecture of FIG. 1.

FIG. 3C illustrates a comparison of data structure between file 200 and in-memory store 300 when in-memory store 300 is compatible with both storage compression schemes 204 and 206 and so storage compression schemes 204 and 206 are re-used as in-memory compression schemes 304 and 306 without transcoding. In this scenario, in-memory compression scheme 304 matches storage compression scheme 204, with in-memory compression dictionary 310a matching storage compression dictionary 210a and in-memory compression dictionary 310b matching storage compression dictionary 210b. Additionally, in-memory compression scheme 306 matches storage compression scheme 206, with an in-memory compression dictionary 320a matching storage compression dictionary 220a and an in-memory compression dictionary 320b matching storage compression dictionaries 220b. As a result, transcoding is optional for this scenario, unlike the scenario depicted in FIG. 3A in which transcoding is required.

In this example, column data set 312a spans only the rows of column chunk 212a, while a column data set 322a spans the rows of column chunk 222a. Also, in this example, column data set 312b spans only the rows of column chunk 212b, while a column data set 322b spans the rows of column chunk 222b.

Figure 4:
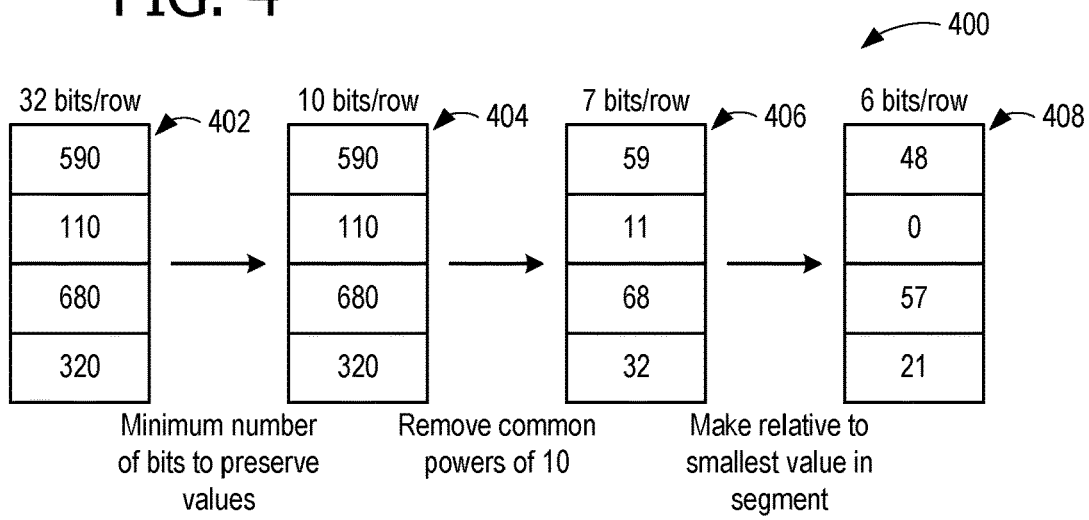
FIG. 4 illustrates an example of bit-packing compression, such as may be used in the example architecture of FIG. 1.

FIG. 4 illustrates an example of bit-packing compression in a bit-packing compression scheme 400. A column 402 of raw data uses 32 bits per row, due to a standard integer size. However, by using the minimum number of bits necessary to preserve the integer values, a column 404 uses only 10 bits. Removing common powers of 10 drops the number of bits per column to 7 in a column 406. For example, 590/10=59. By making all rows within column 406 relative to the smallest number (e.g., by subtracting the smallest number), a column 408 uses only 6 bits per column. For example, 59−11=48.

A similar concept to the change between columns 404 and 406, which may be used for compression in some examples, is value encoding. In value encoding, non-integer floating point numbers are multiplied by a common power of 10 to produce integers, which often may be represented with fewer bits than using floating point data types (e.g., rational numbers). Value encoding advantageously permits direct aggregation of data values without decoding.

FIG. 5 illustrates an example of dictionary compression in a dictionary compression scheme 500. A column 502 of raw data text includes strings "Seattle" twice, "Los Angeles" once, and "Redmond" once. A compression dictionary 504 has dictionary identifiers 506 that are integer values, and a set of dictionary entry strings 508. A dictionary entry 510a has a dictionary identifier of 1 and a string "Seattle". A dictionary entry 510b has a dictionary identifier of 2 and a string "Los Angeles". A dictionary entry 510c has a dictionary identifier of 3 and a string "Redmond". Note that this scheme uses 1-based indexing, rather than 0-based indexing, which may be used for the dictionary identifiers, in some examples.

A column 512 of literal data (e.g., not RLE compressed) lists out the dictionary identifiers according to how the corresponding raw data text appears, for example with two occurrences of the dictionary identifier value of 1 at the end. Column 512 has the same number of rows as column 502, but uses fewer bits per row, due to the dictionary compression using the integer values of 1, 2, and 3 in place of longer textual strings.

RLE may be used with or without a compression dictionary. FIG. 6 illustrates an example of RLE without dictionary encoding, shown as an RLE compression scheme 600. For simplicity of illustration, FIG. 6 spreads the raw data text horizontally. Data text/values 602 is three A's, four B's, five C's, six A's, five B's, four C's, and six D's: "AAABBBBCCCCCAAAAAABBBBBCCCCDDDDDD".

An RLE string 604, that does not use a compression dictionary, has data values followed by the number of repeats: "A3B4C5A6B5C4D6". This scheme uses a threshold of 2 repeating characters before triggering RLE. An example of an RLE string, that resulting from a threshold of 4 repeating characters before triggering RLE, is "AAAB4C5A6B5C4D6", where "AAA" it literal data and the remainder, "4C5A6B5C4D6", is RLE compressed data. A simple example of transcoding is a change "A3B4C5A6B5C4D6" to/from "AAAB4C5A6B5C4D6".

Various compression techniques illustrated herein are complementary and may be used together. For example, RLE may be used with or without a dictionary, and also with or without bit-packing.

FIG. 7 illustrates an example of combining dictionary compression scheme 500, and RLE compression scheme 600 into a combined data compression scheme 700. Uncompressed data 702 is used to generate a compression dictionary 704 with dictionary identifiers 706, having values 1-4 (using 1-based indexing), and strings 708 matching the unique values (590, 110, 680, and 320) of uncompressed data 702. A set of data rows 710 pairs dictionary identifiers 706 with RLE counts 712 (e.g., repeats of the same value). As can be seen, set of data rows 710 has fewer rows than does uncompressed data 702. Together, compression dictionary 704 and set of data rows 710 form compressed data 714.

Note that, in the illustrated example of FIG. 7, uncompressed data 702 uses the same values as shown in column 402 of FIG. 4. To use bit-packing compression scheme 400 with combined data compression scheme 700, the unique values of uncompressed data 702 in strings 708 is merely replaced with the bit-packed values from column 408 of FIG. 4. This replaces the set of values {590, 110, 680, 320} with {48, 0, 57, 21}. Because set of data rows 710 is already compressed, adding bit-packing to combined data compression scheme 700 compresses only compression dictionary 704.

When creating a global compression dictionary for an in-memory store, such as in-memory store 300, typical approaches may include: (1) that each thread performs element-wise lookup/insert/update calls, using fine-grained lock-free operations or lightweight latches for each individual operation, with a per-hash bucket granularity; and (2) each thread takes a lock on the hash table, and then runs lookup/insert/update operations while holding the lock. Such techniques may incur high performance overhead related to memory and cache miss latencies. These may be caused by random access patterns in hash buckets, as well as scalability and contention concerns having to do with concurrent access and synchronization required to expand hash table sizes.

However, pre-sorting and/or clustering may render upsertion (the combination of updating and insertion) to the global compression dictionary more scalable and cache-friendly. Partial reordering of row values in row groups to populate a hash table and global dictionary may maximize cache locality, because values that are near each other in the hash table and global dictionary are inserted in the same order. This increasing the efficiency of memory access and minimizing cache misses, minimizes the amount of time spent in random memory accesses and cache misses, minimizes resource contention (e.g., reduces the amount of time each thread holds locks or latches on hash table structures), and reduces the footprint of CPU caches (e.g., reduces cache line pollution).

FIG. 8 illustrates an example workflow 800 of radix clustering, which is used in some examples to improve the speed of at least dictionary transcoding. In this illustrated example, file 200 has three row groups, including a row group 210 with at least a storage compression dictionary 210a; a row group 220 with at least a storage compression dictionary 220a; and a row group 230 with at least a storage compression dictionary 230a. A read dictionary process 802a reads storage compression dictionary 210a from row group 210; a read dictionary process 802b reads storage compression dictionary 220a from row group 220; and a read dictionary process 802c reads storage compression dictionary 230a from row group 230.

A hash process 804a hashes at least portions of dictionary entries in storage compression dictionary 210a, for example the dictionary identifiers. The hashed values will be sorted after hashing by a hash table bucket identifier to provide optimal cache locality upon dictionary insertion. A hash process 804b similarly hashes dictionary entries in storage compression dictionary 220a, and a hash process 804c similarly hashes dictionary entries in storage compression dictionary 230a.

A process 806 updates a hash table 908 (see FIG. 9). The input for an updated hash table 908a is sorted and clustered by hash buckets to ensure cache friendliness and provide optimal cache locality during dictionary insertions. In some examples, this reduces query latency by about 50% (e.g., from 22 seconds to 12 seconds). For example, an update process 806a updates the hash table with the result from hash process 804a; an update process 806b updates the hash table with the result from hash process 804b; and an update process 806c updates the hash table with the result from hash process 804c.

A read process 808a reads RLE and literal data values from row group 210; a read process 808b reads RLE and literal data values from row group 220; and a read process 808c reads RLE and literal data values from row group 230. Finally, a transcode process 810a transcodes at least storage compression dictionary 210a and the data read in read process 808a; a transcode process 810b transcodes at least storage compression dictionary 220a and the data read in read process 808b; and a transcode process 810c transcodes at least storage compression dictionary 230a and the data read in read process 808c.

FIG. 9 illustrates an example architecture 900 for radix clustering. Architecture 900 is illustrated at the stage in which storage compression dictionary 210b is used to update hash table 908, which has been previously populated with hashed entries from storage compression dictionary 210a. A hash function 902 intakes dictionary entries from storage compression dictionary 210b and generates hashed entries 904, some of which will be inserted into hash table 908 as inserted entries 906a, and some of which are duplicate entries 906b and so do not need to be inserted. Duplicate entries 906b are those entries that are already within hash table 908, such as from a prior-processed compression dictionary.

Architecture 900 sorts vectors of values to be inserted into hash table 908 by their associated hash values. This approach provides more efficient dictionary insertion access patterns which decrease cache misses. In some examples, a sorter 910 uses a radix sort function. Radix sort is a non-comparative sorting algorithm that avoids comparisons by creating and distributing elements into buckets according to their radix. For elements with more than one significant digit, this bucketing process is repeated for each digit, while preserving the ordering of the prior step, until all digits have been considered. Radix sort may have higher benefit for medium-high to high cardinality columns, in some examples. Inserting inserted entries 906a into hash table 908 produces updated hash table 908a.

Figure 10:
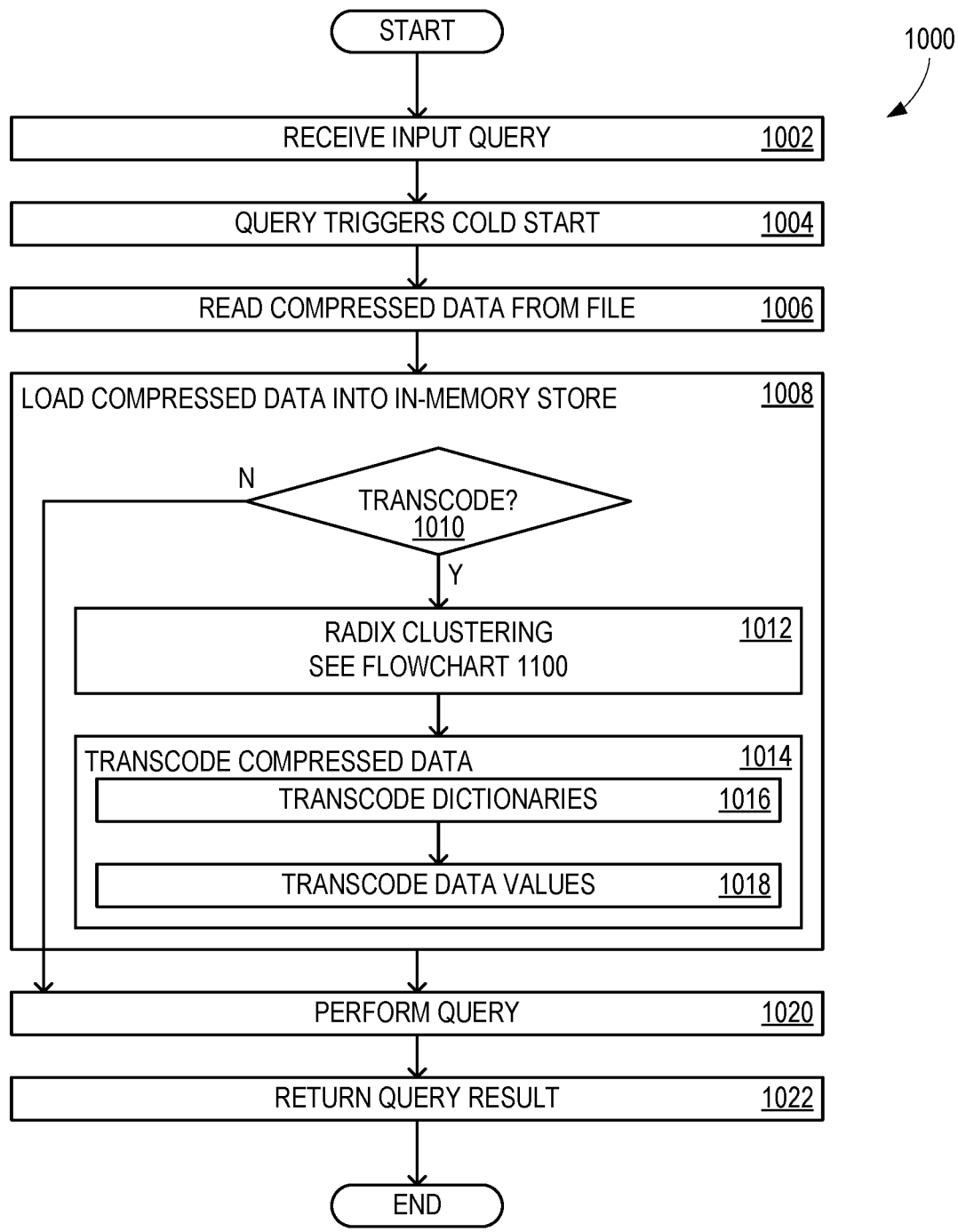
FIGS. 10-13 show flowcharts illustrating exemplary operations that may be performed when using example architectures, such as the architecture of FIG. 1.

FIG. 10 shows a flowchart 1000 illustrating exemplary operations that may be performed by architecture 100 for software code vulnerability reduction. In some examples, operations described for flowchart 1000 are performed by computing device 1400 of FIG. 14. Flowchart 1000 commences with receiving query 104 (e.g., an input query), for example from across network 1430, in operation 1002. In some examples, receiving query 104 triggers a cold start in operation 1004.

Operation 1006 reads compressed data 202 from file 200. In some examples, reading compressed data 202 from file 200 comprises reading file 200 from data lake 112. In some examples, reading the compressed data from file 200 comprises reading the compressed data with stateful enumerator 132 that differentiates between literal data and RLE compressed data.

Operation 1008 loads compressed data 202 as compressed data 302 into in-memory store without decompressing compressed data 202. This is performed using decision operation 1010 through operation 1016. Decision operation 1010 determines the need for transcoding. If in-memory compression scheme 304 matches storage compression scheme 204 and also storage compression scheme 206, and in-memory compression dictionary 310a matches storage compression dictionary 210a and also storage compression dictionary 220a, transcoding may not be needed, and flowchart 1000 moves to operation 1020.

Otherwise, in some examples, operation 1012 performs radix clustering of a plurality of storage compression dictionaries (e.g., storage compression dictionaries 210a and 220a). This is performed in accordance with flowchart 1100 of FIG. 11, in some examples.

Operation 1014 transcodes compressed data 202 from storage compression scheme 204 and storage compression scheme 206 to in-memory compression scheme 304, for example when in-memory compression dictionary 310a differs from storage compression dictionary 210a. Operation 1014 includes operations 1016 and 1018. Operation 1016 transcodes storage compression dictionaries 210a and 220a into in-memory compression dictionary 310a. In some examples, this includes translating dictionary identifiers from dictionary identifiers used in storage compression dictionaries 210a and 220a to dictionary identifiers used in in-memory compression dictionary 310a (see FIG. 5). In some examples, transcoding of the storage compression dictionaries 210a and 220a leverages the radix clustering of flowchart 1100. Operation 1018 transcodes data values in accordance with the transcoded compression dictionaries.

Operation 1020 performs query 104 on compressed data 302 in in-memory store 300, and operation 1022 returns query result 106. In some examples, performing query 104 comprises uses vectorized query execution kernel 144.

Figure 11:
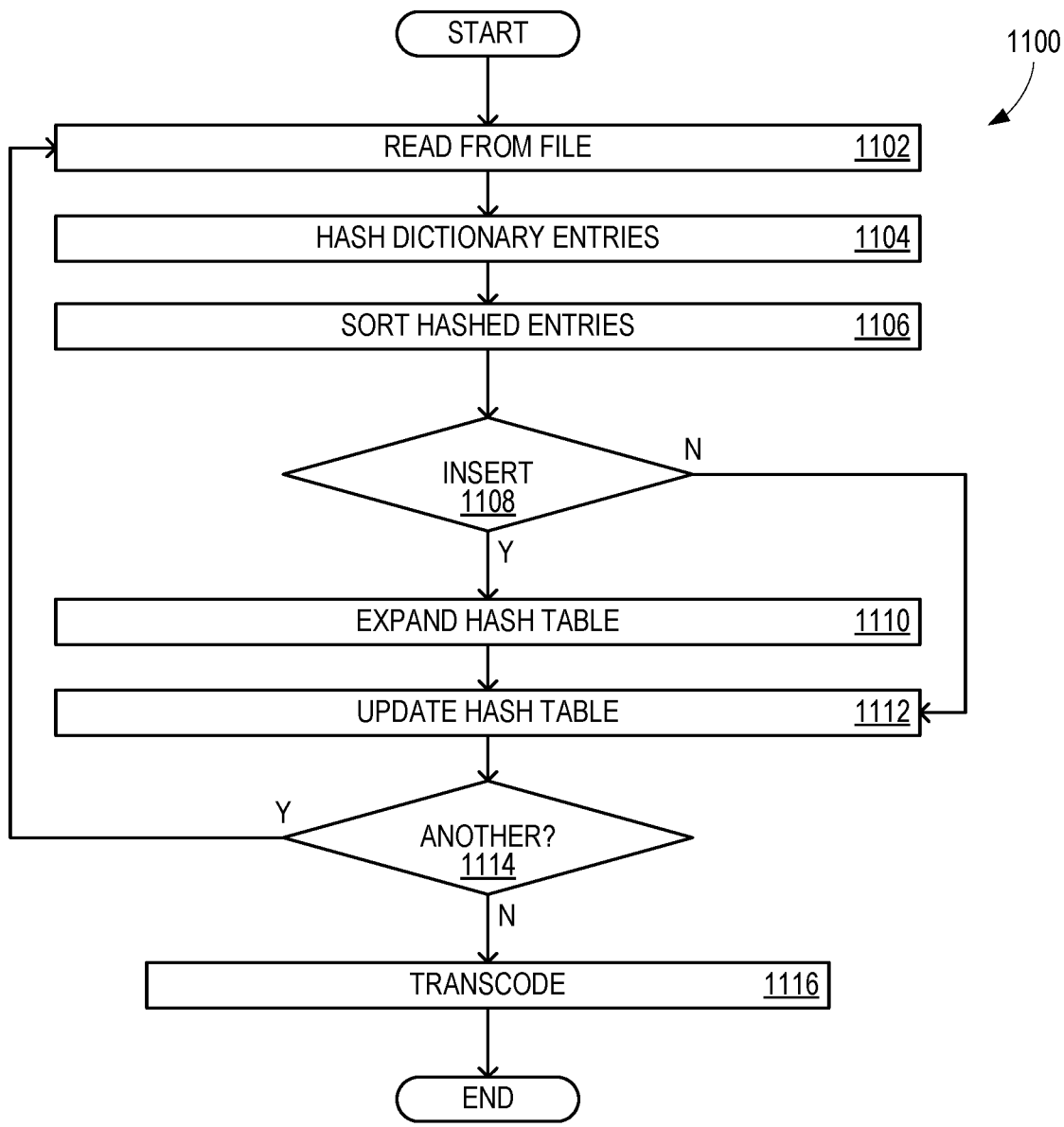

FIG. 11 shows a flowchart 1100 illustrating exemplary operations that may be performed by architecture 900. In some examples, operations described for flowchart 1100 are performed by computing device 1400 of FIG. 14. Flowchart 1100 commences with reading compressed data 202 from file 200, for example storage compression dictionary 210a and (possibly in a second pass) storage compression dictionary 220a, in operation 1002. Operation 1104 hashes entries in storage compression dictionary 210a, and operation 1106 sorts the hashes entries.

Decision operation 1108 determines whether any hash entries are to be inserted into hash table 908. If not, flowchart 1100 moves directly to operation 1112. Otherwise, operation 1110 expands hash table 908 to insert inserted entries 906a and hash table 908 is updates in operation 1110.

Decision operation 1114 determines whether another compression dictionary is to be included. If so, flowchart 1100 returns to operation 1102 and operation 1104 hashes entries in another storage compression dictionary (e.g., storage compression dictionary 220a). When all compression dictionaries have been processed, operation 1116 transcodes the plurality of storage compression dictionaries (e.g., at least storage compression dictionaries 210a and 220a).

Figure 12:
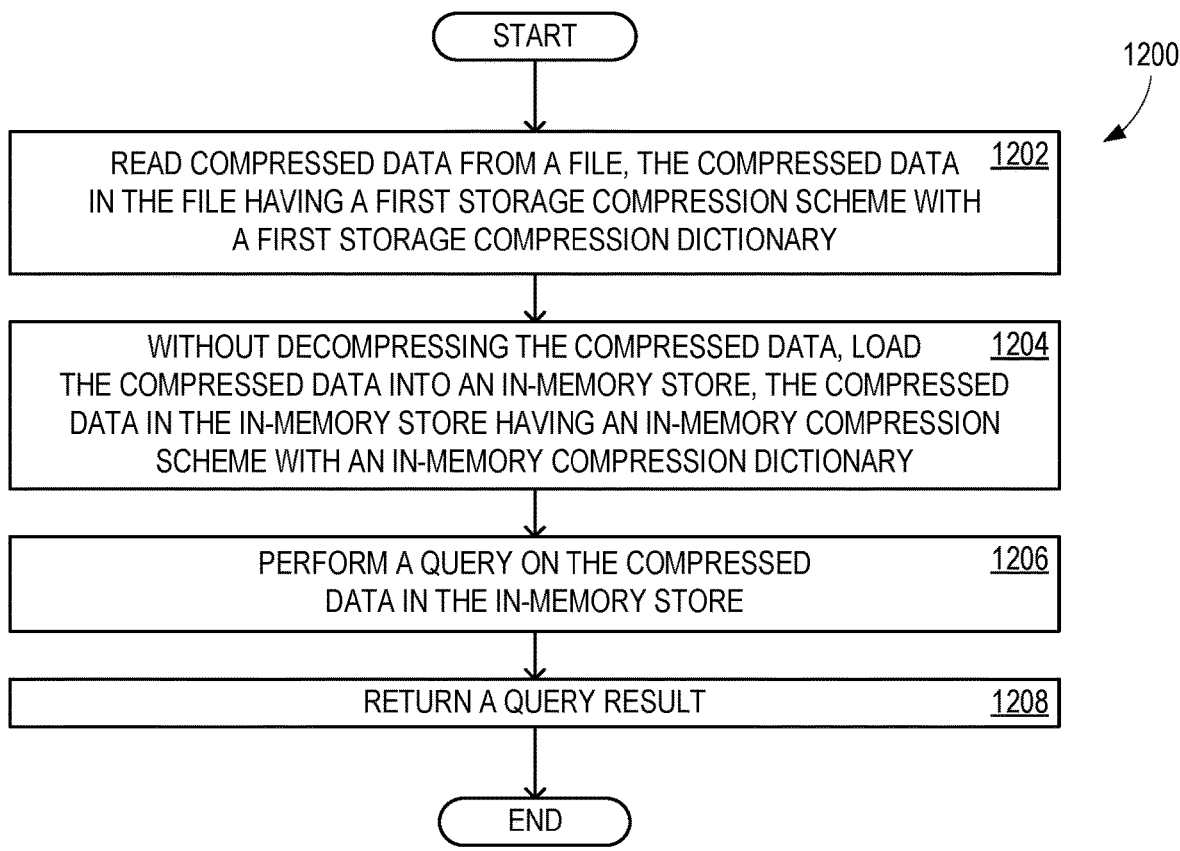

FIG. 12 shows a flowchart 1200 illustrating exemplary operations that may be performed by architecture 100. In some examples, operations described for flowchart 1200 are performed by computing device 1400 of FIG. 14. Flowchart 1200 commences with operation 1202 which includes reading compressed data from a file, the compressed data in the file having a first storage compression scheme with a first storage compression dictionary.

Operation 1204 includes, without decompressing the compressed data, loading the compressed data into an in-memory store, the compressed data in the in-memory store having an in-memory compression scheme with an in-memory compression dictionary. Operation 1206 includes performing a query on the compressed data in the in-memory store. Operation 1208 includes returning a query result.

Figure 13:
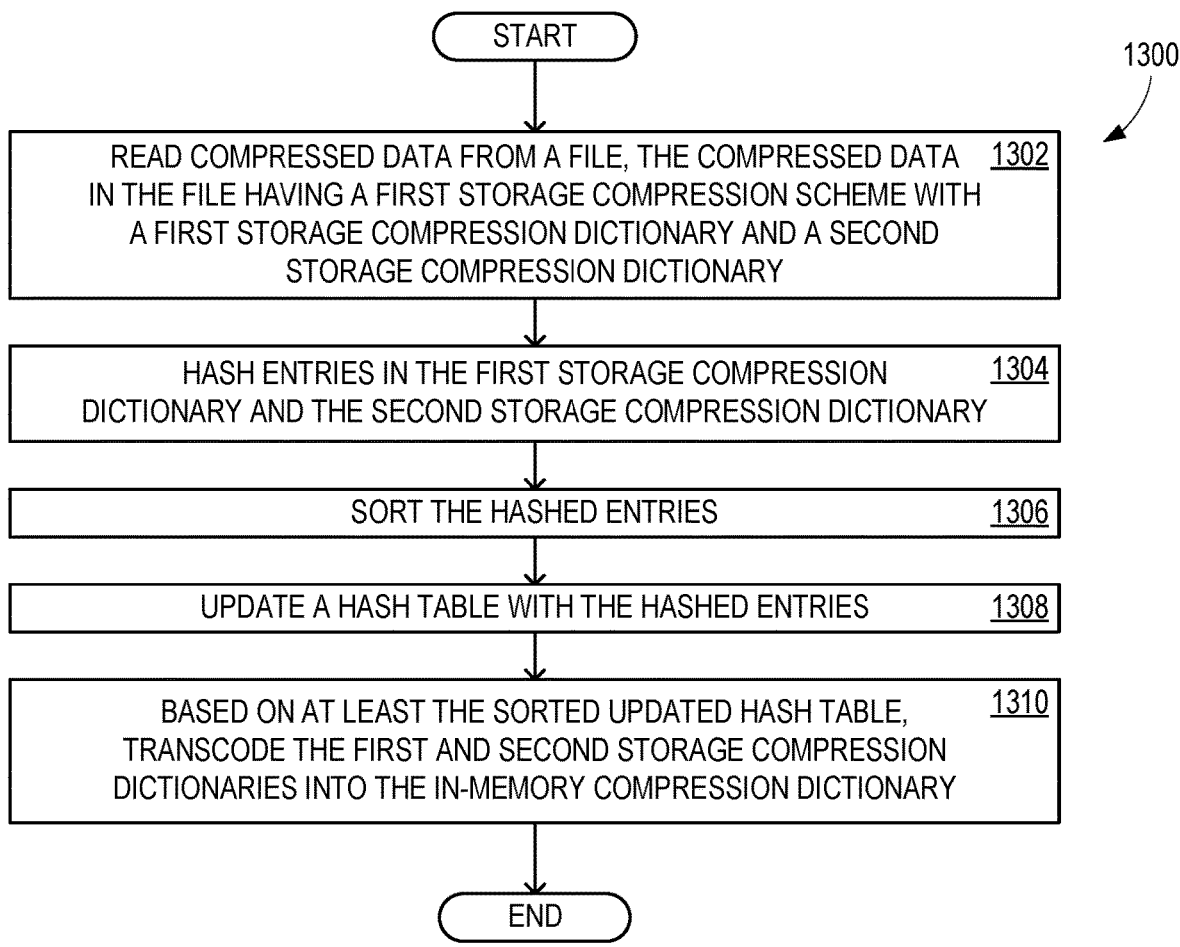

FIG. 13 shows a flowchart 1300 illustrating exemplary operations that may be performed by architecture 100. In some examples, operations described for flowchart 1300 are performed by computing device 1400 of FIG. 14. Flowchart 1300 commences with operation 1302 which includes reading compressed data from a file, the compressed data in the file having a first storage compression scheme with a first storage compression dictionary and a second storage compression dictionary.

Operation 1304 includes hashing entries in the first storage compression dictionary and the second storage compression dictionary. Operation 1306 includes sorting the hashed entries. Operation 1308 includes updating a hash table with the sorted hashed entries. Operation 1310 includes, based on at least the sorted updated hash table, transcoding the first and second storage compression dictionaries into the in-memory compression dictionary.

In another example, the operations illustrated in FIG. 13 are performed for one storage compression dictionary at a time. For example, hashing, sorting, updating, and transcoding are performed for one storage compression dictionary, then repeated for another storage compression dictionary.

Additional Examples

Example solutions for reading compressed data directly into an in-memory store include reading compressed data from a file, wherein the compressed data in the file has a storage compression scheme with a storage compression dictionary. Without decompressing the compressed data, the compressed data is loaded into an in-memory store. The compressed data in the in-memory store has an in-memory compression scheme. A query is performed on the compressed data in the in-memory store, and a query result is returned. In some examples, the in-memory compression scheme is different than the storage compression scheme, whereas in some examples, the in-memory compression scheme and the storage compression scheme are the same. In some examples, the in-memory compression scheme uses a storage compression dictionary and the in-memory compression scheme uses an in-memory compression dictionary An example system comprises: a processor; and a computer-readable medium storing instructions that are operative upon execution by the processor to: read compressed data from a file, the compressed data in the file having a first storage compression scheme with a first storage compression dictionary; without decompressing the compressed data, load the compressed data into an in-memory store, the compressed data in the in-memory store having an in-memory compression scheme with an in-memory compression dictionary; perform a query on the compressed data in the in-memory store; and return a query result.

An example computer-implemented method comprises: receiving a query; reading compressed data from a file, the compressed data in the file having a first storage compression scheme with a first storage compression dictionary; without decompressing the compressed data, loading the compressed data into an in-memory store, the compressed data in the in-memory store having an in-memory compression scheme with an in-memory compression dictionary; performing the query on the compressed data in the in-memory store; and returning a query result.

One or more example computer storage devices have computer-executable instructions stored thereon, which, on execution by a computer, cause the computer to perform operations comprising: reading compressed data from a file, the compressed data in the file having a first storage compression scheme with a first storage compression dictionary; without decompressing the compressed data, loading the compressed data into an in-memory store, the compressed data in the in-memory store having an in-memory compression scheme with an in-memory compression dictionary; receiving a query from across a computer network; performing the query on the compressed data in the in-memory store; and returning a query result.

Another example system comprises: a processor; and a computer-readable medium storing instructions that are operative upon execution by the processor to: read compressed data from a file, the compressed data in the file having a first storage compression scheme with a first storage compression dictionary and a second storage compression dictionary; hash entries in the first storage compression dictionary and the second storage compression dictionary; update a hash table with the hashed entries; sorting the updated hash table; and based on at least the sorted updated hash table, transcode the first and second storage compression dictionaries into the in-memory compression dictionary.

Another example computer-implemented method comprises: reading compressed data from a file, the compressed data in the file having a first storage compression scheme with a first storage compression dictionary and a second storage compression dictionary; hashing entries in the first storage compression dictionary and the second storage compression dictionary; updating a hash table with the hashed entries; sorting the updated hash table; and based on at least the sorted updated hash table, transcoding the first and second storage compression dictionaries into the in-memory compression dictionary.

One or more example computer storage devices have computer-executable instructions stored thereon, which, on execution by a computer, cause the computer to perform operations comprising: reading compressed data from a file, the compressed data in the file having a first storage compression scheme with a first storage compression dictionary and a second storage compression dictionary; hashing entries in the first storage compression dictionary and the second storage compression dictionary; updating a hash table with the hashed entries; sorting the updated hash table; and based on at least the sorted updated hash table, transcoding the first and second storage compression dictionaries into the in-memory compression dictionary.

Alternatively, or in addition to the other examples described herein, examples include any combination of the following:
   transcoding the compressed data from a storage compression scheme to an in-memory compression scheme;
   the in-memory compression dictionary differs from the storage compression scheme;
   the first storage compression dictionary is specific to a first column and a first chunk of compressed data read from the file;
   the compressed data in the file further has a second storage compression dictionary;
   the second storage compression dictionary is specific to the first column and a second chunk of compressed data read from the file;
   the in-memory compression dictionary is specific to the first column of compressed data in the in-memory store;
   the in-memory compression scheme matches the first storage compression scheme, and wherein the in-memory compression dictionary matches the first storage compression dictionary;
   reading the compressed data from the file comprises reading the compressed data with a stateful enumerator that differentiates between literal data RLE compressed data;
   performing radix clustering of a plurality of storage compression dictionaries, the plurality of storage compression dictionaries comprising the first storage compression dictionary;
   based on at least the radix clustering, transcoding the plurality of storage compression dictionary into the in-memory compression dictionary;
   hashing entries in the plurality of storage compression dictionaries;
   updating a hash table with the hashed entries;
   sorting the updated hash table;
   based on at least the sorted updated hash table, transcoding the plurality of storage compression dictionaries into the in-memory compression dictionary;
   updating a hash table with the hashed entries comprises expanding the hash table for inserted entries;
   sorting the updated hash table comprises performing a radix sort;
   receiving the input query;
   receiving the input query from across a computer network;
   receiving the input query triggers a cold start;
   the file comprises a columnar-format file;
   the file uses parquet file format;
   reading the compressed data from the file comprises reading the file from a data lake;
   reading the compressed data from the file comprises reading a row group;
   reading the compressed data from the file comprises reading the compressed data by column chunks;
   reading the compressed data from the file comprises performing a callback;
   the compressed data comprises bit-packed data;
   the compressed data comprises run length encoding (RLE) compressed data;

transcoding the compressed data comprises dictionary transcoding of the storage compression dictionary into the in-memory compression dictionary;

the dictionary transcoding comprises translating dictionary identifiers from dictionary identifiers used in the first storage compression dictionary to dictionary identifiers used in the in-memory compression dictionary;

the dictionary transcoding further comprises translating dictionary identifiers from dictionary identifiers used in the second storage compression dictionary to dictionary identifiers used in the in-memory compression dictionary;

loading the compressed data into an in-memory store without un-bit-packing the compressed data;

performing the query on the compressed data in the in-memory store in response to receiving the input query;

performing the query comprises using a vectorized query execution kernel;

the vectorized query execution kernel is compatible with the in-memory compression scheme and uses the in-memory compression dictionary; and the vectorized query execution kernel is compatible with the first storage compression scheme and uses the first storage compression dictionary.

While the aspects of the disclosure have been described in terms of various examples with their associated operations, a person skilled in the art would appreciate that a combination of operations from any number of different examples is also within scope of the aspects of the disclosure.

Example Operating Environment

Figure 14:
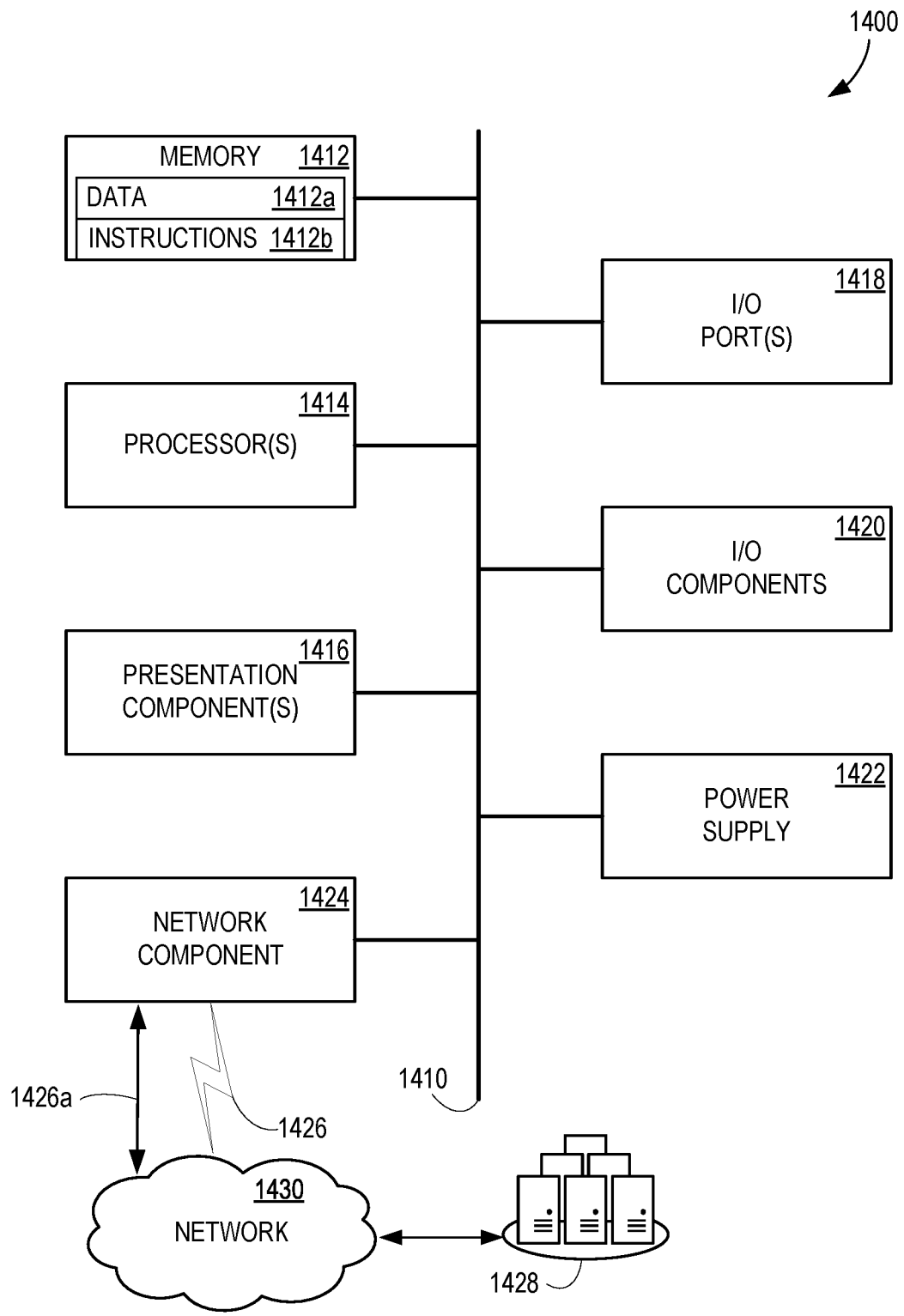
FIG. 14 shows a block diagram of an example computing device suitable for implementing some of the various examples disclosed herein.

FIG. 14 is a block diagram of an example computing device 1400 (e.g., a computer storage device) for implementing aspects disclosed herein, and is designated generally as computing device 1400. In some examples, one or more computing devices 1400 are provided for an on-premises computing solution. In some examples, one or more computing devices 1400 are provided as a cloud computing solution. In some examples, a combination of on-premises and cloud computing solutions are used. Computing device 1400 is but one example of a suitable computing environment and is not intended to suggest any limitation as to the scope of use or functionality of the examples disclosed herein, whether used singly or as part of a larger set.

Neither should computing device 1400 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1400 includes a bus 1410 that directly or indirectly couples the following devices: computer storage memory 1412, one or more processors 1414, one or more presentation components 1416, input/output (I/O) ports 1418, I/O components 1420, a power supply 1422, and a network component 1424. While computing device 1400 is depicted as a seemingly single device, multiple computing devices 1400 may work together and share the depicted device resources. For example, memory 1412 may be distributed across multiple devices, and processor(s) 1414 may be housed with different devices.

Bus 1410 represents what may be one or more busses (such as an address bus, data bus, or a combination thereof). Although the various blocks of FIG. 14 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 14 and the references herein to a "computing device." Memory 1412 may take the form of the computer storage media referenced below and operatively provide storage of computer-readable instructions, data structures, program modules and other data for the computing device 1400. In some examples, memory 1412 stores one or more of an operating system, a universal application platform, or other program modules and program data. Memory 1412 is thus able to store and access data 1412a and instructions 1412b that are executable by processor 1414 and configured to carry out the various operations disclosed herein.

In some examples, memory 1412 includes computer storage media. Memory 1412 may include any quantity of memory associated with or accessible by the computing device 1400. Memory 1412 may be internal to the computing device 1400 (as shown in FIG. 14), external to the computing device 1400 (not shown), or both (not shown). Additionally, or alternatively, the memory 1412 may be distributed across multiple computing devices 1400, for example, in a virtualized environment in which instruction processing is carried out on multiple computing devices 1400. For the purposes of this disclosure, "computer storage media," "computer storage memory," "memory," and "memory devices" are synonymous terms for the memory 1412, and none of these terms include carrier waves or propagating signaling.

Processor(s) 1414 may include any quantity of processing units that read data from various entities, such as memory 1412 or I/O components 1420. Specifically, processor(s) 1414 are programmed to execute computer-executable instructions for implementing aspects of the disclosure. The instructions may be performed by the processor, by multiple processors within the computing device 1400, or by a processor external to the client computing device 1400. In some examples, the processor(s) 1414 are programmed to execute instructions such as those illustrated in the flow charts discussed below and depicted in the accompanying drawings. Moreover, in some examples, the processor(s) 1414 represent an implementation of analog techniques to perform the operations described herein. For example, the operations may be performed by an analog client computing device 1400 and/or a digital client computing device 1400. Presentation component(s) 1416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1400, across a wired connection, or in other ways. I/O ports 1418 allow computing device 1400 to be logically coupled to other devices including I/O components 1420, some of which may be built in. Example I/O components 1420 include, for example but without limitation, a microphone, joystick, game pad, satellite dish, scanner, printer, wireless device, etc.

Computing device 1400 may operate in a networked environment via the network component 1424 using logical connections to one or more remote computers. In some examples, the network component 1424 includes a network interface card and/or computer-executable instructions (e.g., a driver) for operating the network interface card. Communication between the computing device 1400 and other devices may occur using any protocol or mechanism over any wired or wireless connection. In some examples, network component 1424 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1424 communicates over wireless communication link 1426 and/or a wired communication link 1426*a* to a remote resource 1428 (e.g., a cloud resource) across network 1430. Various different examples of communication links 1426 and 1426*a* include a wireless connection, a wired connection, and/or a dedicated link, and in some examples, at least a portion is routed through the internet.

Although described in connection with an example computing device 1400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer-readable medium storing instructions that are operative upon execution by the processor to:
read compressed data from a file, the compressed data in the file having a first storage compression scheme with a first storage compression dictionary;
without decompressing the compressed data, load the compressed data into an in-memory store, the compressed data in the in-memory store having an in-memory compression scheme with an in-memory compression dictionary;
transcode the compressed data from the first storage compression scheme to the in-memory compression scheme based on radix clustering;
perform a query on the compressed data in the in-memory store; and
return a query result.

2. The system of claim 1, wherein the in-memory compression dictionary differs from the first storage compression scheme.

3. The system of claim 1,
wherein the first storage compression dictionary is specific to a first column and a first chunk of compressed data read from the file;
wherein the compressed data in the file further has a second storage compression dictionary;
wherein the second storage compression dictionary is specific to the first column and a second chunk of compressed data read from the file; and
wherein the in-memory compression dictionary is specific to the first column of compressed data in the in-memory store.

4. The system of claim 1, wherein the in-memory compression scheme matches the first storage compression scheme, and wherein the in-memory compression dictionary matches the first storage compression dictionary.

5. The system of claim 1, wherein reading the compressed data from the file comprises reading the compressed data with a stateful enumerator, or one or more callbacks, that differentiates between literal data and run length encoding (RLE) compressed data.

6. The system of claim 1, wherein the instructions are further operative to:
perform radix clustering of a plurality of storage compression dictionaries, the plurality of storage compression dictionaries comprising the first storage compression dictionary.

7. The system of claim 6, wherein performing radix clustering of the plurality of storage compression dictionaries comprises:
hashing entries in the plurality of storage compression dictionaries;
updating a hash table with the hashed entries;
sorting the updated hash table; and
based on at least the sorted updated hash table, transcoding the plurality of storage compression dictionaries into the in-memory compression dictionary.

8. A computer-implemented method comprising:
receiving a query;
reading compressed data from a file, the compressed data in the file having a first storage compression scheme with a first storage compression dictionary;
without decompressing the compressed data, loading the compressed data into an in-memory store, the compressed data in the in-memory store having an in-memory compression scheme with an in-memory compression dictionary;
transcoding the compressed data from the first storage compression scheme to the in-memory compression scheme based on radix clustering;
performing the query on the compressed data in the in-memory store; and
returning a query result.

9. The computer-implemented method of claim 8, wherein the in-memory compression dictionary differs from the first storage compression scheme.

10. The computer-implemented method of claim 8,
wherein the first storage compression dictionary is specific to a first column and a first chunk of compressed data read from the file;
wherein the compressed data in the file further has a second storage compression dictionary;
wherein the second storage compression dictionary is specific to the first column and a second chunk of compressed data read from the file; and
wherein the in-memory compression dictionary is specific to the first column of compressed data in the in-memory store.

11. The computer-implemented method of claim 8, wherein the in-memory compression scheme matches the first storage compression scheme, and wherein the in-memory compression dictionary matches the first storage compression dictionary.

12. The computer-implemented method of claim 8, wherein reading the compressed data from the file comprises reading the compressed data with a stateful enumerator, or one or more callbacks, that differentiates between literal data and run length encoding (RLE) compressed data.

13. The computer-implemented method of claim 8, further comprising:
performing radix clustering of a plurality of storage compression dictionaries, the plurality of storage compression dictionaries comprising the first storage compression dictionary.

14. The computer-implemented method of claim 13, wherein performing radix clustering of the plurality of storage compression dictionaries comprises:
hashing entries in the plurality of storage compression dictionaries;
updating a hash table with the hashed entries;
sorting the updated hash table; and
based on at least the sorted updated hash table, transcoding the plurality of storage compression dictionaries into the in-memory compression dictionary.

15. A computer storage device having computer-executable instructions stored thereon, which, on execution by a computer, cause the computer to perform operations comprising:
reading compressed data from a file, the compressed data in the file having a first storage compression scheme with a first storage compression dictionary;
without decompressing the compressed data, loading the compressed data into an in-memory store, the compressed data in the in-memory store having an in-memory compression scheme with an in-memory compression dictionary;
transcoding the compressed data from the first storage compression scheme to the in-memory compression scheme based on radix clustering;
receiving a query from across a computer network;

performing the query on the compressed data in the in-memory store; and returning a query result.

16. The computer storage device of claim 15, wherein the in-memory compression dictionary differs from the first storage compression scheme.

17. The computer storage device of claim 15,
wherein the first storage compression dictionary is specific to a first column and a first chunk of compressed data read from the file;
wherein the compressed data in the file further has a second storage compression dictionary;
wherein the second storage compression dictionary is specific to the first column and a second chunk of compressed data read from the file; and
wherein the in-memory compression dictionary is specific to the first column of compressed data in the in-memory store.

18. The computer storage device of claim 15, wherein the in-memory compression scheme matches the first storage compression scheme, and wherein the in-memory compression dictionary matches the first storage compression dictionary.

19. The computer storage device of claim 15, wherein reading the compressed data from the file comprises reading the compressed data with a stateful enumerator, or one or more callbacks, that differentiates between literal data and run length encoding (RLE) compressed data.

20. The computer storage device of claim 15, wherein the operations further comprise:
hashing entries in a plurality of storage compression dictionaries, the plurality of storage compression dictionaries comprising the first storage compression dictionary;
updating a hash table with the hashed entries;
sorting the updated hash table; and
based on at least the sorted updated hash table, transcoding the plurality of storage compression dictionaries into the in-memory compression dictionary.

* * * * *